United States Patent
Suo

(10) Patent No.: US 10,440,278 B2
(45) Date of Patent: Oct. 8, 2019

(54) IMAGING DEVICE AND SYSTEM INCLUDING IMAGING DEVICE AND SERVER

(71) Applicant: Panasonic Intellectual Property Management Co., Ltd., Osaka (JP)

(72) Inventor: Toshinari Suo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 80 days.

(21) Appl. No.: 15/918,016

(22) Filed: Mar. 12, 2018

(65) Prior Publication Data

US 2018/0198988 A1 Jul. 12, 2018

Related U.S. Application Data

(63) Continuation of application No. PCT/JP2016/003937, filed on Aug. 30, 2016.

(30) Foreign Application Priority Data

Sep. 18, 2015 (JP) .................................. 2015-185763

(51) Int. Cl.
*H04N 5/232* (2006.01)
*G03B 7/091* (2006.01)
(Continued)

(52) U.S. Cl.
CPC ........... *H04N 5/23293* (2013.01); *G03B 7/01* (2015.01); *G03B 7/091* (2013.01); *G03B 17/18* (2013.01);
(Continued)

(58) Field of Classification Search
CPC .......... G03B 7/01; G03B 17/18; G03B 17/20; G06K 9/00228; G06K 9/00671;
(Continued)

(56) References Cited

U.S. PATENT DOCUMENTS 6,310,648 B1 * 10/2001 Miller ................ H04N 5/23293
348/333.05
7,119,841 B1 * 10/2006 Sako ........................ A61B 6/00
348/333.05
(Continued)

FOREIGN PATENT DOCUMENTS

JP 2007-194819 A 8/2007
JP 2009-033398 A 2/2009
(Continued)

OTHER PUBLICATIONS

International Search Report for International Appl. No. PCT/JP2016/003937, dated Nov. 22, 2016.

*Primary Examiner* — Pritham D Prabhakher
(74) *Attorney, Agent, or Firm* — Renner, Otto, Boisselle & Sklar, LLP

(57) ABSTRACT

An imaging device includes an imaging unit that images a subject and generates image data, an image processor that performs predetermined image processing on the image data generated by the imaging unit, a storage unit in which items of setting information concerning a setting for photographing set by a user are stored, and a controller that controls the imaging unit and the image processor. At a time of photographing, the controller extracts setting information corresponding to a photographing scene from among the items of setting information stored in the storage unit and causes icon for selecting the extracted setting information to be displayed on display unit. Icon includes a thumbnail image generated based on an image acquired when each of the items of the setting information set by the user is stored.

8 Claims, 15 Drawing Sheets

(51) Int. Cl.
| | |
|---|---|
| *G03B 17/18* | (2006.01) |
| *G03B 7/01* | (2014.01) |
| *G03B 17/20* | (2006.01) |
| *G06K 9/00* | (2006.01) |
| *G06K 9/46* | (2006.01) |
| *G06K 9/52* | (2006.01) |
| *H04N 1/00* | (2006.01) |
| *H04N 1/21* | (2006.01) |
| *G06F 3/0481* | (2013.01) |
| *G06F 3/0484* | (2013.01) |
| *H04L 29/06* | (2006.01) |

(52) U.S. Cl.
CPC ......... *G03B 17/20* (2013.01); *G06K 9/00228* (2013.01); *G06K 9/00671* (2013.01); *G06K 9/00684* (2013.01); *G06K 9/4642* (2013.01); *G06K 9/4661* (2013.01); *G06K 9/52* (2013.01); *H04N 1/00* (2013.01); *H04N 1/21* (2013.01); *H04N 5/23206* (2013.01); *H04N 5/23216* (2013.01); *H04N 5/23222* (2013.01); *H04N 5/23245* (2013.01); *H04N 5/232933* (2018.08); *G06F 3/04817* (2013.01); *G06F 3/04845* (2013.01); *H04L 67/42* (2013.01); *H04N 5/23219* (2013.01)

(58) Field of Classification Search
CPC ............. G06K 9/00684; G06K 9/4642; G06K 9/4661; G06K 9/52; H04N 1/00; H04N 1/21; G06F 3/04817; G06F 3/04845; H04L 67/42

USPC ...................................................... 348/229.1
See application file for complete search history.

(56) References Cited

U.S. PATENT DOCUMENTS

| | | | | |
|---|---|---|---|---|
| 7,480,002 | B2* | 1/2009 | Goh | H04N 5/23245 348/333.01 |
| 7,656,451 | B2* | 2/2010 | Yanagi | H04N 1/2112 348/333.05 |
| 7,956,906 | B2* | 6/2011 | Nojima | H04N 1/2104 348/220.1 |
| 8,054,343 | B2* | 11/2011 | Cheatle | H04N 1/00183 348/14.01 |
| 8,212,911 | B2* | 7/2012 | Nonaka | H04N 5/23219 348/333.02 |
| 8,477,228 | B2* | 7/2013 | Stallings | H04N 1/00132 348/333.05 |
| 9,141,857 | B2* | 9/2015 | Ariyama | G06K 9/036 |
| 2007/0171282 | A1 | 7/2007 | Yanagi | |
| 2010/0205566 | A1* | 8/2010 | Matoba | G06F 3/0488 715/838 |
| 2013/0202209 | A1 | 8/2013 | Ariyama | |
| 2016/0212230 | A1* | 7/2016 | Schneider | H04L 67/22 |

FOREIGN PATENT DOCUMENTS

| | | |
|---|---|---|
| JP | 2013-162436 A | 8/2013 |
| JP | 2014-155208 A | 8/2014 |

\* cited by examiner

FIG. 3

■ SCENE AUTOMATIC DETERMINING MODE

| SCENE | CONTENTS |
|---|---|
| PERSON | FACE CAN BE PHOTOGRAPHED BRIGHTLY AND BEAUTIFULLY |
| BABY | FACE CAN BE PHOTOGRAPHED IN HEALTHY COLOR LIGHT IS SET WEAK IN PHOTOGRAPHING USING FLASH |
| LANDSCAPE | BOTH NEAR SIDE AND FAR SIDE CAN BE CLEARLY PHOTOGRAPHED |
| MACRO | EASILY COME INTO FOCUS EVEN AT CLOSE RANGE |
| FACE & NIGHT SCENE | FACE CAN BE PHOTOGRAPHED BRIGHTLY AND EASILY COME INTO FOCUS |
| NIGHT SCENE | NIGHT SCENE CAN BE PHOTOGRAPHED WITHOUT CHANGING ATMOSPHERE |
| HAND-HELD NIGHT SCENE | NIGHT SCENE CAN BE PHOTOGRAPHED BRIGHTLY AND VIVIDLY IN HAND-HELD PHOTOGRAPHING |
| MOTION | MOTION CAN BE CAPTURED WHILE PREVENTING BLUR |
| SUNSET | VIVID RED CAN BE REPRODUCED |
| FOOD | FOOD CAN BE PHOTOGRAPHED SUCH THAT IT LOOKS MORE DELICIOUS |

FIG. 4

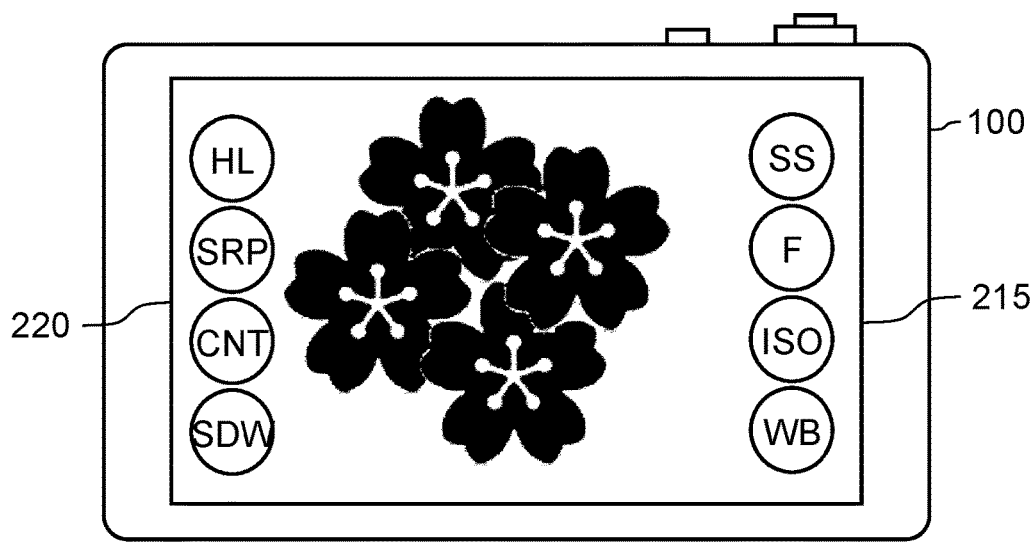

FIG. 5

| | LIVE-VIEW SETTING |
|---|---|
| DIAPHRAGM | SETTABLE |
| SHUTTER SPEED | SETTABLE |
| ISO | SETTABLE |
| EXPOSURE CORRECTION | SETTABLE |
| WB | SETTABLE |
| CONTRAST | SETTABLE |
| SHARPNESS | SETTABLE |
| NR | SETTABLE |
| SATURATION | SETTABLE |
| HUE | SETTABLE |
| PHOTO STYLE | SETTABLE |
| iD RANGE CONTROL | SETTABLE |
| HIGHTLIGHT | SETTABLE |
| SHADOW | SETTABLE |
| SUPER-RESOLUTION | SETTABLE |

RETOUCH FUNCTION (CONTRAST through SUPER-RESOLUTION)

SCENE DETERMINATION INFORMATION
(MATCHING CONDITION 1)

| FACE RECOGNITION RESULT |
| --- |
| SUBJECT DISTANCE |
| ILLUMINANCE |
| ON/OFF OF FLASH SETTING |
| PRESENCE OR ABSENCE OF MOTION DETECTION |
| RESULT OF MATCHING WITH DICTIONARY |
| COLOR TONE |

DETERMINATION INFORMATION
(MATCHING CONDITION 2)

| WEATHER |
| --- |
| (CORRECT) DATE AND TIME |
| (CORRECT) POSITION |
| DIRECTION |
| ELEVATION ANGLE |

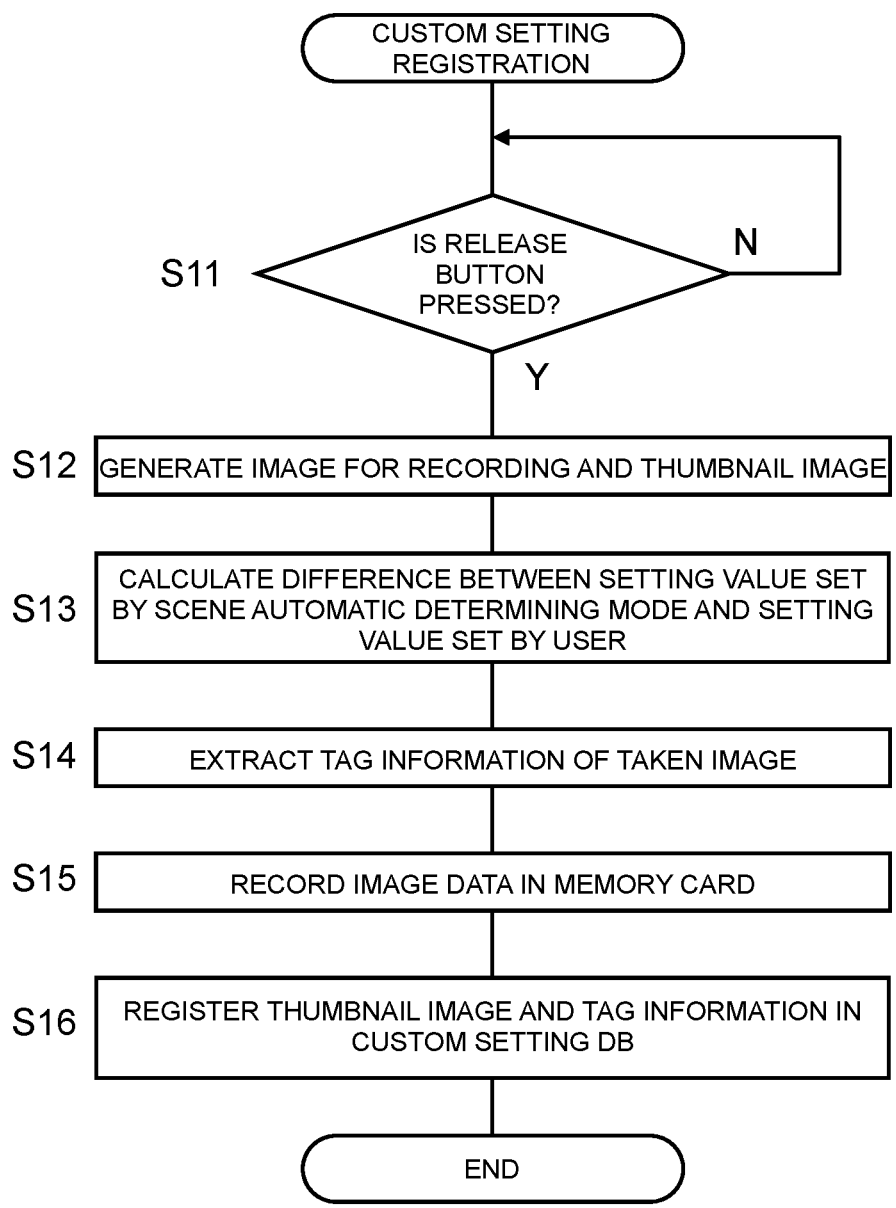

IMAGING DEVICE AND SYSTEM INCLUDING IMAGING DEVICE AND SERVER

BACKGROUND

1. Technical Field

The present disclosure relates to an imaging device in which various settings (custom settings) concerning photographing set by a user can be registered.

2. Description of the Related Art

A digital camera in which various kinds of information concerning photographing can be selected in accordance with user's preference and these kinds of information can be held as custom settings is known (see, for example, Unexamined Japanese Patent Publication No. 2009-033398).

SUMMARY

The present disclosure provides an imaging device that is capable of extracting and displaying setting information corresponding to a photographing scene from among pieces of setting information concerning photographing conditions set in accordance with user's preference so that favorite setting information can be easily selected.

A first aspect of the present disclosure provides an imaging device. The imaging device includes a display unit, an imaging unit that images a subject and generates image data, an image processor that performs predetermined image processing on the image data generated by the imaging unit, a storage unit in which items of setting information concerning a setting for photographing set by a user are stored, and a controller that controls the imaging unit and the image processor. At a time of photographing, the controller extracts setting information corresponding to a photographing scene from among the items of setting information stored in the storage unit and causes an icon for selecting the extracted setting information to be displayed on the display unit. The icon includes a thumbnail image generated based on an image acquired when each of the items of the setting information set by the user is stored.

A second aspect of the present disclosure provides a system including an imaging device and a server that is connected to the imaging device over a network. The server includes a storage unit in which items of setting information concerning a setting for photographing set by an unspecified user are stored. The imaging device transmits information to be used to determine a photographing scene to the server. The server extracts setting information corresponding to a photographing scene from among the items of setting information stored in the storage unit based on the information to be used to determine the photographing scene and transmits the extracted setting information to the imaging device. The imaging device causes an icon including a thumbnail image generated based on an image acquired when each of the items of setting information is stored to be displayed on a display unit in order to accept selection of the received setting information, and the icon includes a thumbnail image generated based on an image acquired when each of the items of setting information set by an unspecified user is stored.

BRIEF DESCRIPTION OF THE DRAWINGS

FIG. 3 is a view for explaining a scene determined by a scene automatic determining mode;

FIG. 4 is a view for explaining operation buttons displayed on a display monitor of the digital camera;

FIG. 5 is a view for explaining a list of the operation buttons displayed on the display monitor of the digital camera;

FIG. 8 is a flowchart illustrating a process for automatically registering a custom setting;

DETAILED DESCRIPTION

Exemplary embodiments will be described in detail below with reference to the drawings as appropriate. However, descriptions in more detail than necessary may be omitted. For example, a detailed description of a matter which is already well known and a repeated description for a substantially identical configuration may be omitted. This is to avoid an unnecessarily redundant description and to facilitate understanding of a person skilled in the art. Here, the inventor provides the attached drawings and the following description such that those skilled in the art can sufficiently understand the present disclosure, and therefore, they do not intend to restrict the subject matters of claims.

The exemplary embodiments of an imaging device of the present disclosure will be described below with reference to the drawings.

(First Exemplary Embodiment)

1. Configuration

Figure 1A:
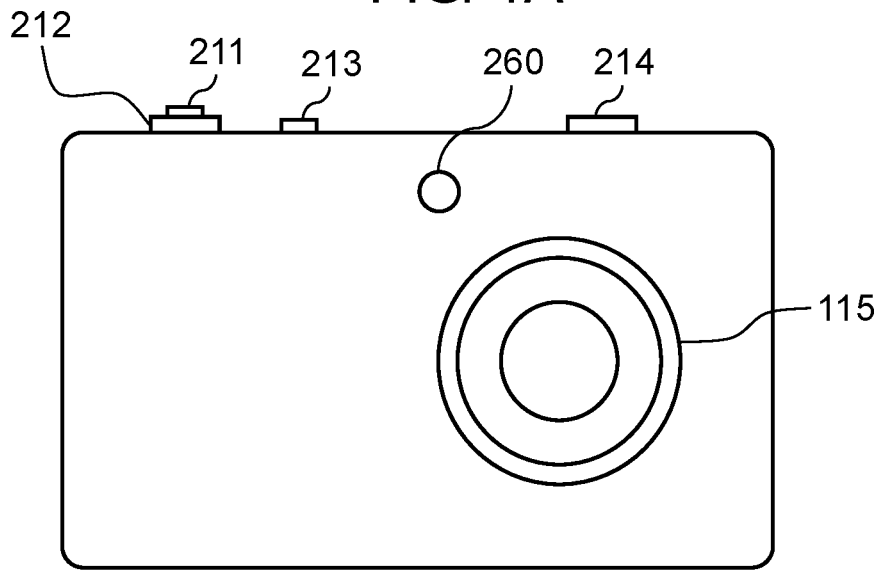
FIG. 1A is an external view of a digital camera according to the present disclosure.
Figure 1B:
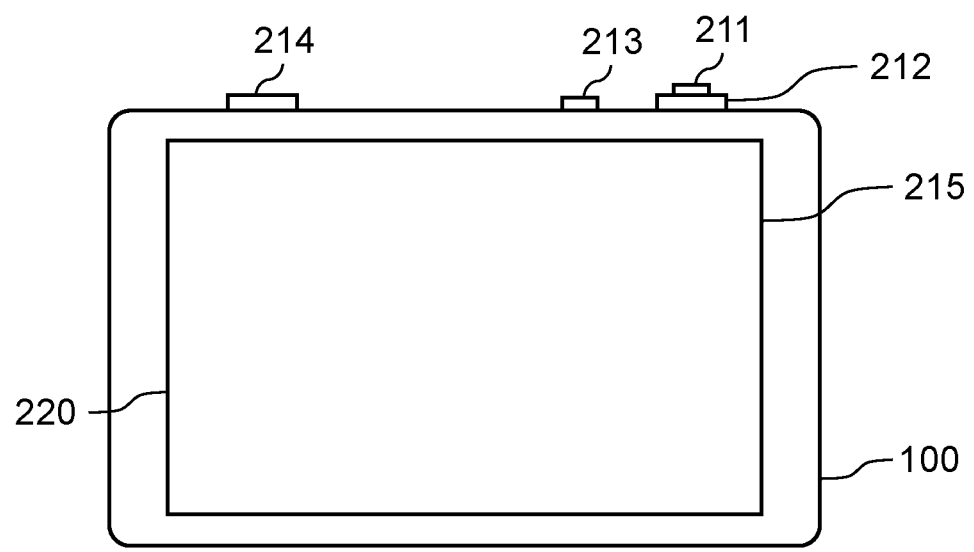
FIG. 1B is an external view of the digital camera according to the present disclosure.

FIGS. 1A and 1B are external views of a digital camera according to a first exemplary embodiment. FIG. 1A is a front view of digital camera 100, and FIG. 1B is a back view of digital camera 100. As illustrated in FIGS. 1A and 1B, digital camera 100 includes lens barrel 115 containing an optical system and electronic flash 260 on a front surface of digital camera 100. Digital camera 100 includes release button 211, zoom lever 212, power button 213, and mode switching dial 214 on an upper surface of digital camera 100. Digital camera 100 includes display monitor 220 and touch panel 215 disposed so as to overlap display monitor 220 on a back surface of digital camera 100.

Figure 2:
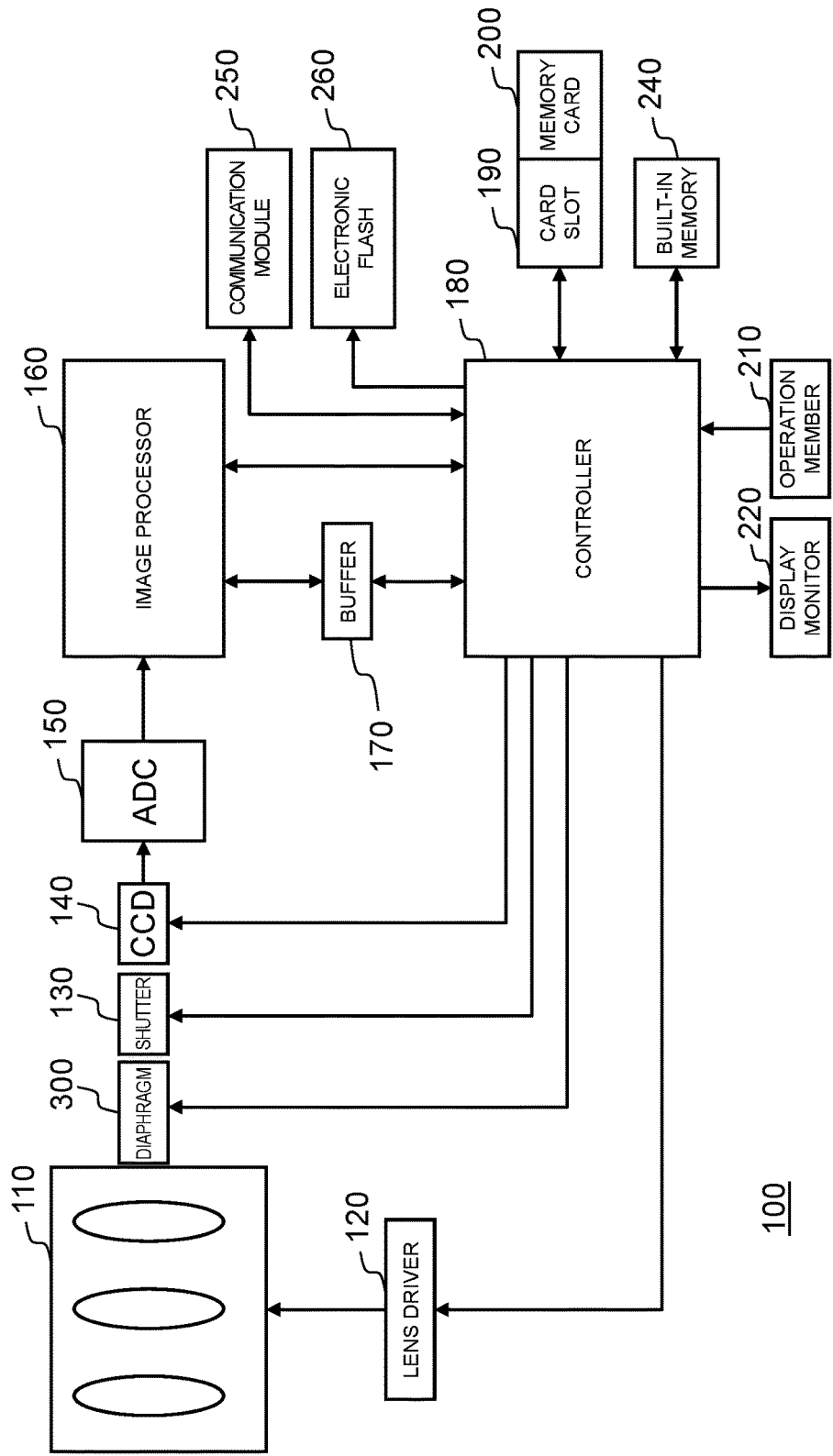
FIG. 2 is a block diagram illustrating an internal configuration of the digital camera according to the present disclosure.

FIG. 2 is a block diagram illustrating an example of an electrical configuration of digital camera 100. The electrical configuration of digital camera 100 will be described with reference to FIG. 2. Digital camera 100 is an imaging device that causes charge-coupled device (CCD) 140 to capture a subject image formed by optical system 110 made up of one or more lenses. Image data generated by CCD 140 is subjected to various types of processing in image processor 160 and is then stored in memory card 200. The configuration of digital camera 100 will be described in detail below.

Optical system 110 includes a zoom lens and a focus lens. By moving the zoom lens along an optical axis, it is possible to enlarge or reduce the subject image. Furthermore, by moving the focus lens along the optical axis, it is possible to adjust a focus (in-focus state) on the subject image.

Lens driver 120 drives various kinds of lenses included in optical system 110. Lens driver 120 includes, for example, a zoom motor which drives the zoom lens and a focus motor which drives the focus lens.

Diaphragm 300 adjusts a size of an aperture according to a user's setting or automatically to thereby adjust an amount of light passing through the aperture.

Shutter 130 is a unit for shielding light to be transmitted to CCD 140. Shutter 130 constitutes an optical system unit that controls optical information indicating the subject image together with optical system 110 and diaphragm 300. Further, optical system 110 and diaphragm 300 are housed in lens barrel 115.

CCD 140 captures the subject image formed by optical system 110, and generates image data. CCD 140 includes a color filter, a light-receiving element, and an auto gain controller (AGC). The light-receiving element converts an optical signal of light collected by optical system 110 into an electrical signal and generates image information. The AGC amplifies the electrical signal output from the light-receiving element. CCD 140 further includes a driving circuit and the like that perform various kinds of operations such as exposure, transfer, and electronic shutter. This will be described later in detail.

Analog-digital converter (A/D converter: ADC) 150 converts analog image data generated by CCD 140 into digital image data.

Based on control of controller 180, image processor 160 performs various types of processing on the digital image data generated and converted by CCD 140. Image processor 160 generates image data to be displayed on display monitor 220 and generates image data to be stored in memory card 200. For example, image processor 160 performs various types of processing such as Gamma correction, white balance correction, and damage correction, on the image data generated by CCD 140. Furthermore, image processor 160 compresses the image data generated by CCD 140 according to a compression format which complies with H.264 standards or MPEG2 standards. Image processor 160 can be realized, for example, by a digital signal processor (DSP) or a microcomputer. Furthermore, image processor 160 can generate image data (4K moving image data) of a moving image of approximately 4000×2000 pixels based on the image data generated by CCD 140. Image processor 160 can perform various types of processing described below on the generated 4K moving image data.

Controller 180 (an example of a controller) is a control unit that entirely controls digital camera 100. Controller 180 can be achieved by a semiconductor element, for example. Controller 180 may be configured by hardware alone or may be achieved by a combination of hardware and software. Controller 180 can be achieved by a microcontroller, a central processing unit (CPU), a micro processing unit (MPU), a DSP, an application specific integrated circuit (ASIC), a field programmable gate array (FPGA), and the like.

Buffer 170 functions as a work memory of image processor 160 and controller 180. Buffer 170 can be realized by, for example, a dynamic random access memory (DRAM) or a ferroelectric memory.

Card slot 190 is a unit for attachment of memory card 200 to digital camera 100. Card slot 190 can mechanically and electrically connect memory card 200 and digital camera 100.

Memory card 200 includes a non-volatile memory such as a flash memory or a ferroelectric memory inside and can store data such as image files generated by image processor 160.

Built-in memory 240 is a non-volatile memory such as a flash memory or a ferroelectric memory. Built-in memory 240 stores a control program for controlling entire digital camera 100, data, and the like. Furthermore, built-in memory 240 stores a custom setting database (DB) (details will be described later).

Communication module 250 is a communication interface for communicating with an apparatus on a network in compliance with a wired or wireless communication standard.

Display monitor 220 can display an image (a through image) indicated by the image data generated by CCD 140 or an image indicated by image data read from memory card 200. Display monitor 220 can also display various menu screens for making various settings of digital camera 100. Display monitor 220 (an example of a display) is configured with a liquid crystal display device or an organic electroluminescence (EL) display device.

Operation member 210 is a generic term of a user interface that receives a user's operation. Operation member 210 includes, for example, a button, a lever, a dial, a touch panel, and a switch which receive a user's operation. Operation member 210 also includes a button virtually displayed on display monitor 220. Operation member 210 includes, for example, release button 211, zoom lever 212, power button 213, mode switching dial 214, and touch panel 215.

Release button 211 is a two-stage pressing type pressing button. When a user presses release button 211 halfway down, controller 180 executes, for example, autofocus control (AF control) and auto exposure control (AE control). When the user presses release button 211 fully down, controller 180 records image data captured at a timing of the pressing operation as a recording image in, for example, memory card 200.

Zoom lever 212 is a lever for adjusting an angle of view between a wide angle end and a telephoto end. Controller 180 drives the zoom lens in accordance with a user's operation to zoom lever 212.

Power button 213 is a switch for switching between ON and OFF of power supply to each part of digital camera 100.

Mode switching dial 214 is a dial for switching a scene mode. The scene mode is a generic term of a mode set in accordance with a photographing situation. Factors that influence the photographing situation include a subject, a photographing environment, and the like. Any one of a plurality of scene modes is set by switching of mode switching dial 214.

Touch panel 215 is overlaid on a display screen of display monitor 220 and detects a touch operation on a display screen performed by the user's finger. Thus, the user can perform, for example, an operation for designating a region on an image displayed on display monitor 220.

2. Operation 2.1 Scene Automatic Determining Mode

Digital camera 100 according to the present exemplary embodiment has, as an imaging mode, a scene automatic determining mode in addition to an A mode (a diaphragm priority mode), an S mode (shutter speed priority mode), a P mode (program mode), and the like. The scene automatic determining mode is a mode for automatically determining a scene to be imaged by a user based on states of an image and a subject and automatically setting a photographing condition (e.g., a diaphragm, a shutter speed, an ISO sensitivity (ISO), and a color tone) appropriate for the scene. FIG. 3 illustrates an example of modes determined by the scene automatic determining mode. Examples of a determined photographing scene include "person", "baby", "landscape", "macro", and "night scene". Each scene is determined based on various conditions (e.g., a subject distance and illuminance) of imaging.

For example, in a case where it is determined that an image that is being taken is a "person", processes such as a process based on a program chart for portrait, a process for increasing saturation in color reproduction setting, a gamma correction process of a portrait setting, a skin color correcting process of the portrait setting, a process for setting a contour enhancement correction gain weaker than usual, and a process for controlling an ISO sensitivity and a shutter speed based on tripod determination are performed. By performing such processes, it is possible to photograph a subject person so that the subject person looks well.

Meanwhile, in a case where it is determined that an image that is being taken is a "landscape", processes such as a process for setting gamma correction to hard tone, a process for setting contour enhancement correction gain high, and a process for controlling automatic white balance for landscape are performed. By performing such processes, it is possible to make the whole image sharper, thereby making it possible to photograph a landscape of spreading impression.

Meanwhile, in a case where it is determined that an image that is being taken is a "night scene", processes such as a process for making a shutter speed low by controlling shutter 130, a process based on a program chart for a night scene, an automatic white balance process for a night scene, a process for setting gamma correction to hard tone, and a process for controlling an ISO sensitivity and a shutter speed based on tripod determination are performed. By performing such processes, it is possible to photograph a night scene in a vivid manner.

The photographing scene is determined, for example, as follows. In a case where a human face is detected in an image that is being taken, it is determined that a scene in the image is a "person". In a case where a distance to a subject is a short distance indicating macro photographing, it is determined that a scene in the image is "macro". In a case where a distance to a subject is a distance indicating a landscape and where illuminance is illuminance indicating outdoor, it is determined that a scene in the image is a "landscape". The photographing scene can be determined (recognized) by using a known technique (see, for example, WO 2009/013850).

2.2 Custom Setting

Digital camera 100 according to the present exemplary embodiment has a function of registering a setting value of a photographing condition (e.g., a diaphragm, a shutter speed, an ISO sensitivity, exposure correction, white balance) set in accordance with user's preference at the time of photographing. The registered setting is hereinafter referred to as a "custom setting".

In particular, digital camera 100 according to the present exemplary embodiment has a function of automatically registering a custom setting at a time of completion of photographing in the scene automatic determining mode. Conventionally, a user needs to perform a troublesome operation of manually opening a menu and registering a custom setting. However, in the present exemplary embodiment, the custom setting is automatically registered without user's awareness at a time of photographing. This improves user's convenience. The user can call up the registered custom setting and apply the custom setting to later photographing.

FIG. 4 illustrates an example of display buttons (a user interface) for the custom setting, which are displayed on display monitor 220 of digital camera 100. A user's operation on these display buttons is detected by a function of touch panel 215. In the example of FIG. 4, buttons for adjusting a shutter speed ("SS"), a diaphragm ("F"), an ISO sensitivity ("ISO"), and white balance ("WB") are displayed on display monitor 220. Furthermore, in addition to these buttons, buttons for retouch functions of highlight ("HL"), sharpness ("SRP"), contrast ("CNT"), and shadow ("SDW") are displayed.

Highlight, sharpness, contrast, shadow, and the like are setting items that are adjusted by a retouch operation after photographing. Conventionally, these setting items are items set in a deep layer of a menu. However, in the present exemplary embodiment, buttons for operating retouch functions such as highlight ("HL") or sharpness ("SRP") are displayed on a live-view screen, as illustrated in FIG. 4. This allows a user to operate the retouch functions without entering the menu, thereby allowing the user to check an image reflecting a result of the retouch operation as a live-view image displayed on display monitor 220.

FIG. 5 illustrates a list of items that can be set on the live-view screen of display monitor 220 of digital camera 100 according to the present exemplary embodiment. In digital camera 100 according to the present exemplary embodiment, the items in the list of FIG. 5 can be set at a time of photographing. That is, as for retouch functions, items such as saturation and hue can be changed in addition to the items such as highlight and sharpness illustrated in FIG. 4, as illustrated in FIG. 5. Kinds of operation buttons displayed on display monitor 220 can be switched as appropriate by performing a predetermined operation (e.g., an operation on the menu). In the following description, the photographing conditions include the items in the list of FIG. 5. That is, the photographing conditions also include items, such as contrast and sharpness, concerning retouch functions that are set at a time of photographing or after photographing in addition to items, such as a diaphragm, a shutter speed, an ISO sensitivity, exposure correction, and white balance (WB), which are set at a time of photographing.

A user can set a desired photographing condition to a predetermined value in accordance with user's preference by using an operation button displayed on display monitor 220. When the user has set the photographing condition, an image reflecting the setting is displayed as the live-view image on display monitor 220. This allows the user to perform a retouch operation while checking a finished state of the image by referring to the live-view image.

2.3 Automatic Registration of Custom Setting

Digital camera 100 according to the present exemplary embodiment has a function of automatically registering a setting (custom setting) of a photographing condition arbitrarily set by a user in the scene automatic determining mode.

Specifically, various photographing conditions (e.g., a diaphragm, a shutter speed, and exposure correction) automatically set in the scene automatic determining mode can be set (changed) to desired values by the user. In a case where an image is taken after a setting is changed by the user in the scene automatic determining mode, digital camera 100 automatically stores, as the custom setting, the photographing conditions (e.g., a diaphragm, a shutter speed, an ISO sensitivity, and exposure correction) set by the user.

Figure 6:
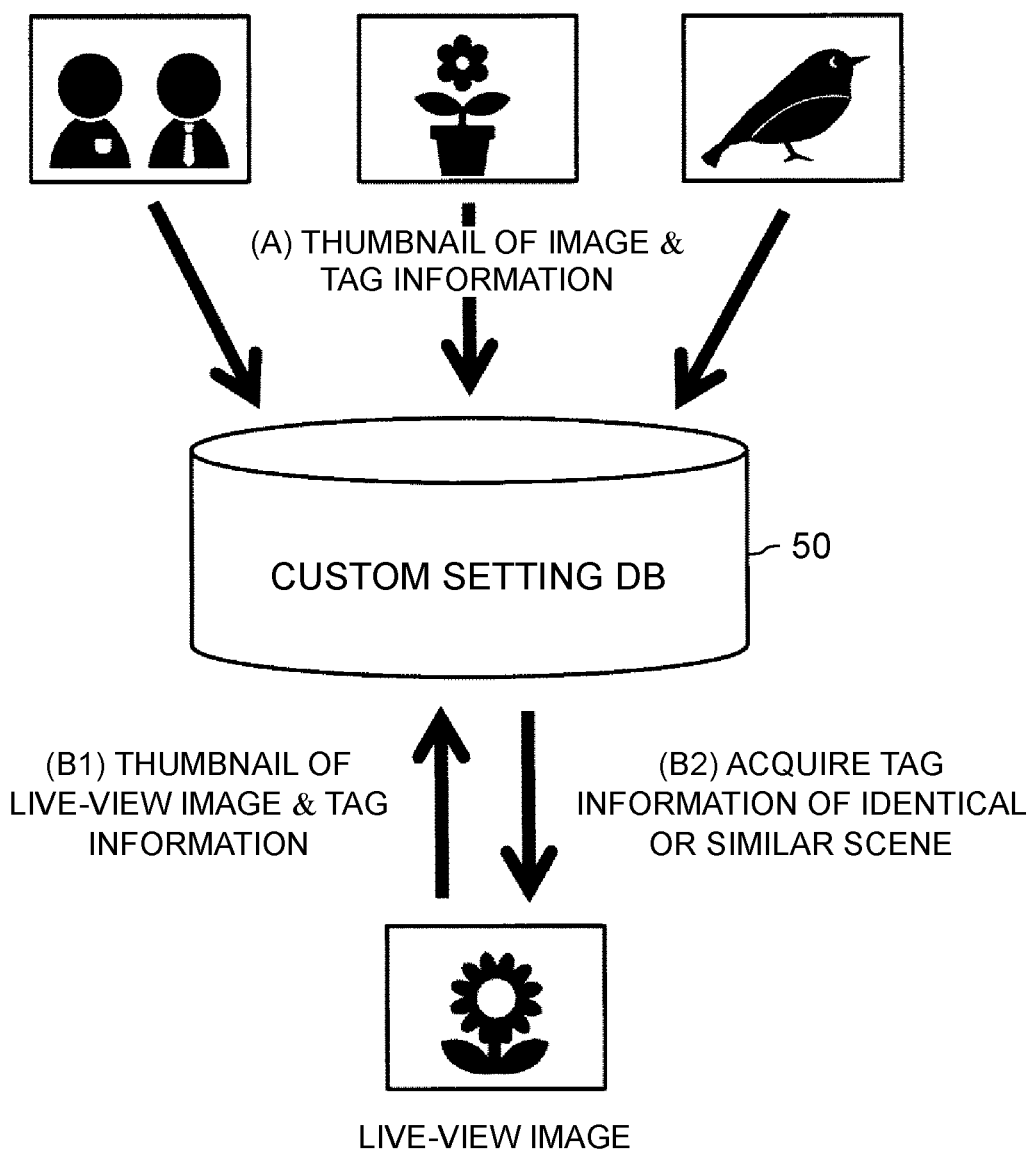
FIG. 6 is a view for explaining registration and acquisition of a custom setting in a custom setting database.

FIG. 6 is a view for explaining automatic registration of the custom setting in digital camera 100. After completion of photographing, digital camera 100 automatically registers, in custom setting database (DB) 50 as the custom setting, a thumbnail image of the taken image and tag information including information concerning various settings (photographing conditions) and a state of a subject at a time of photographing (see step A).

In a case where the user takes another image later, the user extracts a custom setting (tag information) for a scene that matches a scene of a live-view image from among custom settings registered in custom setting DB 50 (see steps B1 and B2). The user can set a desired setting from among the extracted custom settings (tag information) in digital camera 100. According to such a configuration, a photographing condition set by the user in the past can be easily set in digital camera 100 in a case where a similar scene is photographed.

Figures 7A, 7B, 7C:
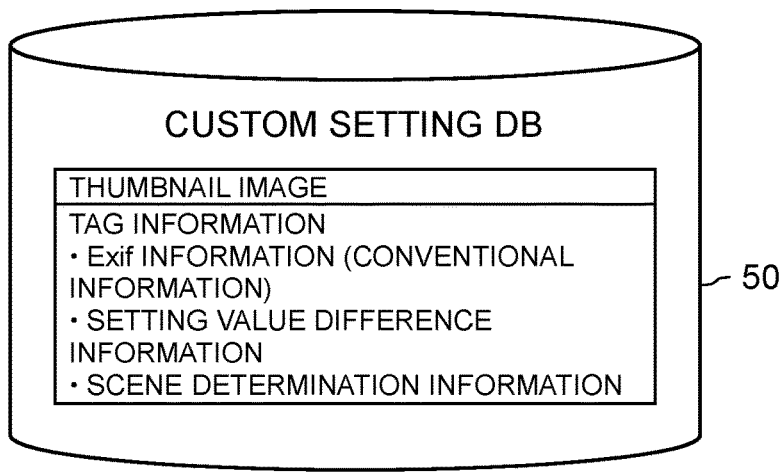
FIG. 7A is a view for explaining a data structure of the custom setting database.
FIG. 7B is a view for explaining a data structure of the custom setting database.
FIG. 7C is a view for explaining a data structure of the custom setting database.

As illustrated in FIG. 7A, a thumbnail image of a taken image and tag information are registered as the custom setting in custom setting DB 50. The tag information is information concerning a photographing environment and includes Exchangeable image file format (Exif) information (information included in typical Exif information in this case), setting value difference information, and scene determination information of the taken image. The thumbnail image and the tag information are held in custom setting DB 50 so as to be associated with each other. Furthermore, in the tag information, the Exif information (information included in typical Exif information), the setting value difference information, and the scene determination information are associated with one another. For example, these pieces of information can be associated with one another by recording the setting value difference information, the scene determination information, and a file name of the thumbnail image in MakerNote of the Exif information.

The setting value difference information is information indicative of a difference between a setting value automatically set by the scene automatic determining mode and a setting value set by the user (a case where the user sets a value in addition to a photographing condition automatically set). For example, in a case where a diaphragm setting is set to a desired value by the user after various setting values are automatically set by the scene automatic determining mode, a difference between a diaphragm value automatically set and the diaphragm value set by the user is calculated.

The scene determination information is information needed to determine a photographing scene and includes, for example, a face recognition result, a subject distance, illuminance, on/off of a flash setting, a result of motion detection, a result of matching with dictionary data, and information on color tone, as illustrated in FIG. 7B. The face recognition result is information indicating whether or not a human face has been recognized in a taken image (or a live-view image). The on/off of a flash setting is information indicating whether or not electronic flash 260 was used in photographing. The result of motion detection is information indicating whether or not a moving subject has been detected in the image. The color tone is color tone of the image.

The result of matching with dictionary data is information indicating whether or not the image includes a predetermined object by referring to dictionary data prepared in advance for detection of the predetermined object. For example, dictionary data for detecting a night scene as a predetermined object is stored in built-in memory 240. This dictionary data is dictionary data for determining tendency of a distribution of a histogram generated based on a large number of images of various kinds of night scenes. Controller 180 can determine whether or not a taken image is an image (scene) of a night scene by comparing the dictionary data and a histogram obtained from the taken image. Note that it is possible to make a determination as to various objects by changing a kind of object included in images that constitute the dictionary data.

The tag information may further include determination information such as weather, correct date and time, a correct position (position of a place where an image was taken), a direction, and an elevation angle illustrated in FIG. 7C. The information illustrated in FIG. 7C can be acquired over a network (cloud) or can be acquired by a dedicated sensor. Accordingly, in order to acquire the information illustrated in FIG. 7C, digital camera 100 needs to have a function for connecting to a network or include a dedicated sensor. The information illustrated in FIGS. 7B and 7C is acquired by controller 180 during display of a live-view image.

There is an upper limit to a number of custom settings stored in custom setting DB 50. Therefore, in a case where the number of stored custom settings exceeds the upper limit, custom settings may be deleted in order of registration date from oldest to newest such that the number of stored custom settings does not exceed the upper limit.

FIG. 8 is a flowchart illustrating a process for automatically registering a custom setting in digital camera 100. The process for automatically registering the custom setting in the scene automatic determining mode is described below with reference to the flowchart of FIG. 8.

When release button 211 is pressed down after a user changes photographing conditions set based on a scene determination result to a desired setting in the scene automatic determining mode (S11), controller 180 generates an image (taken image) to be recorded and generates a thumbnail image from an image captured by CCD 140 (S12).

Next, controller 180 finds a difference between setting values of the photographing conditions (e.g., a diaphragm, a shutter speed, and an ISO sensitivity) automatically set in the scene automatic determining mode and the setting value set by the user (S13). In this step, as for the diaphragm and the shutter speed, controller 180 finds differences in number of steps.

Furthermore, controller 180 acquires the tag information (information illustrated in FIGS. 7A through 7C) of the taken image (S14).

Then, controller 180 records image data of the taken image in memory card 200 (S15). Furthermore, controller 180 registers the thumbnail image and the tag information in custom setting DB 50 in built-in memory 240 so as to be associated with each other (S16).

Through the above processes, a setting obtained after the user customizes photographing conditions automatically set in the scene automatic determining mode can be automatically registered in digital camera 100.

Figure 9:
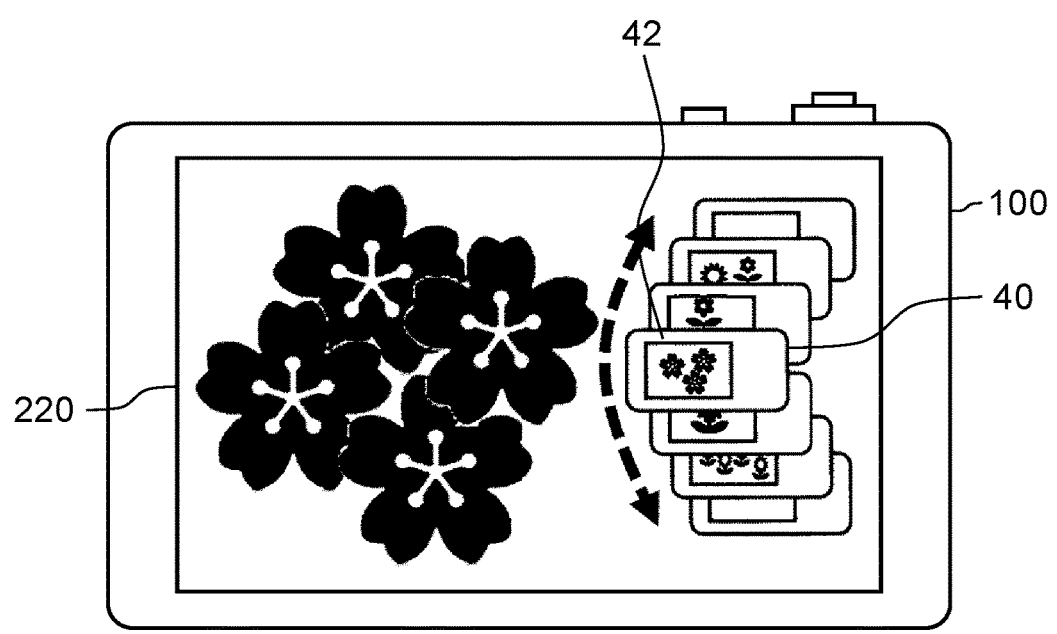
FIG. 9 is a view for explaining an icon for setting selection displayed for selection of a custom setting.

FIG. 9 is a view for explaining icons displayed for the user to select a desired custom setting from among a plurality of custom settings thus registered. As illustrated in FIG. 9, icons 40 for custom setting selection are displayed for respective custom settings registered in the past on display monitor 220 of digital camera 100. Icon 40 displayed on top on display monitor 220 can be sequentially switched by moving the icons by a touch action. By touching icon 40 displayed on the top, the user can select a custom setting corresponding to the icon. Icon 40 includes thumbnail image 42 of an image taken when the custom setting corresponding to icon 40 is set. Thumbnail image 42 allows the user to easily grasp contents of the custom setting.

Figure 10:
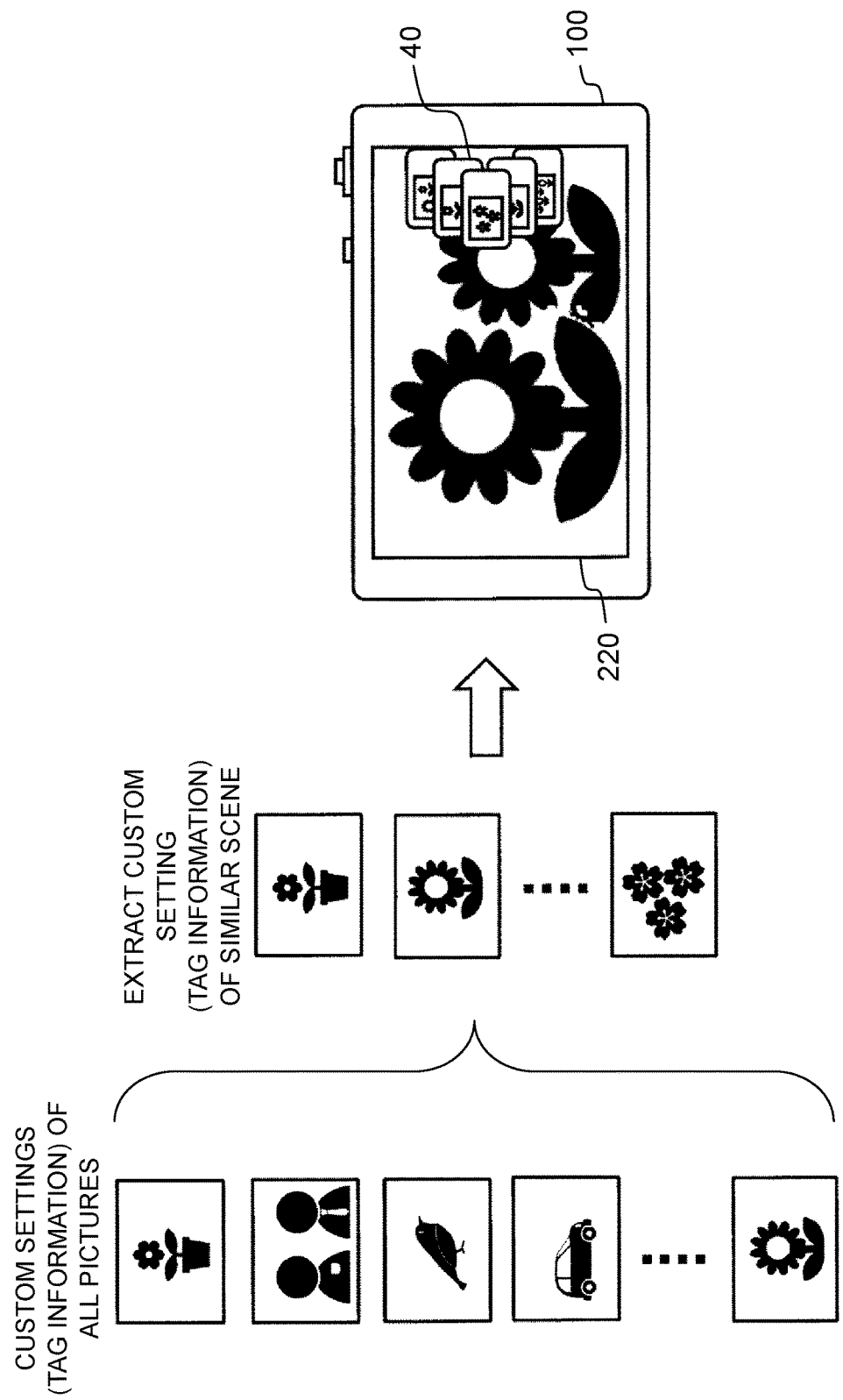
FIG. 10 is a view for explaining how a custom setting (tag information) is narrowed down.

In a case where a large number of custom settings are registered in custom setting DB 50, displaying all of the custom settings on display monitor 220 makes it hard for the user to find a desired setting, thereby impairing convenience. In view of this, in the present exemplary embodiment, custom settings set for an image of the same scene as a scene to be imaged by the user are extracted from among the custom settings registered in custom setting DB 50, and icons 40 representative of the extracted custom setting are displayed on display monitor 220 (see FIG. 10). For example, in a case where the user is trying to photograph a flower scene, custom settings for the flower scene are extracted and are presented to the user. This allows the user to easily apply, to current photographing, a style applied to past photographing of a similar scene.

2.4 Automatic Extraction of Custom Setting

Figure 11:
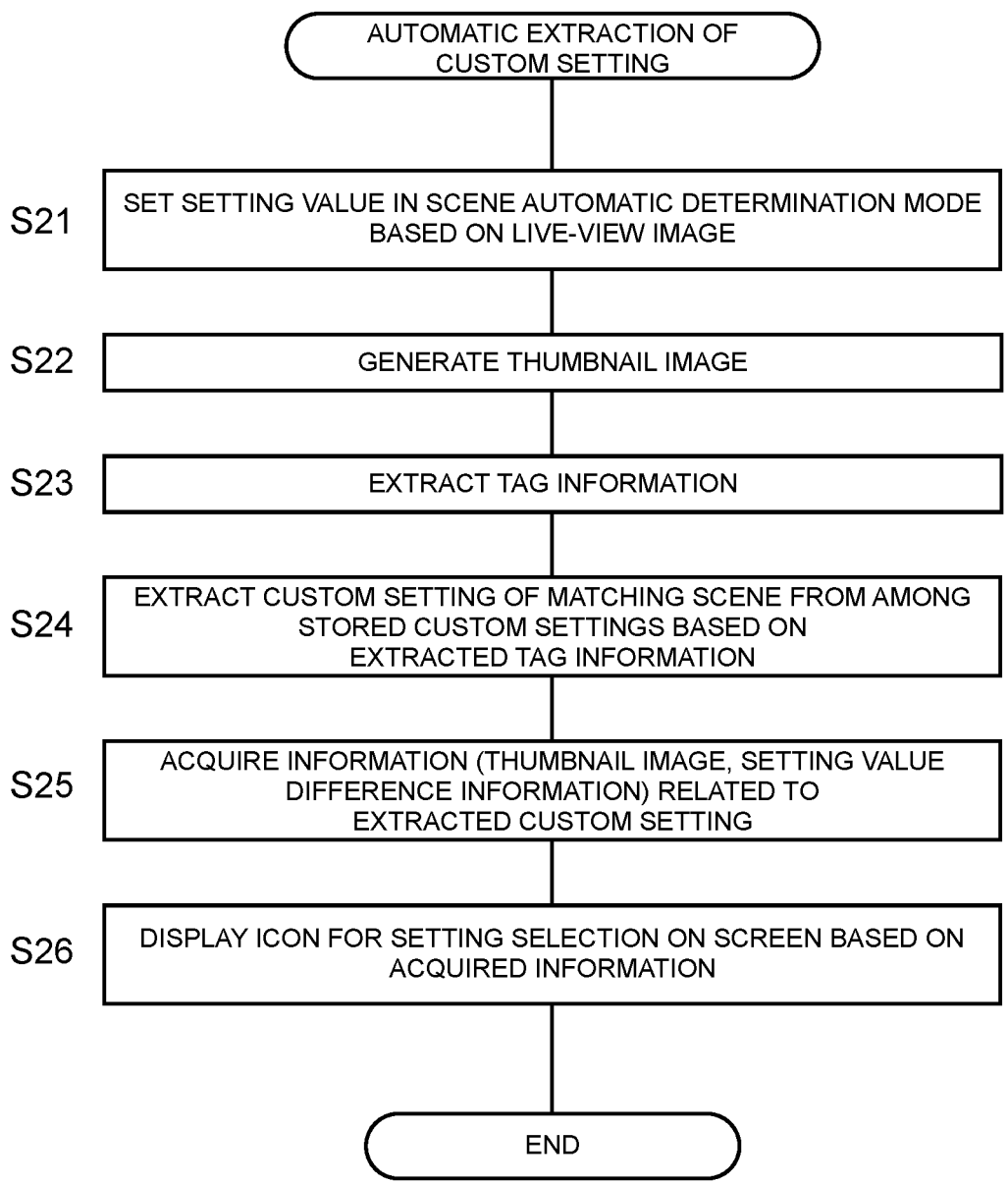
FIG. 11 is a flowchart illustrating a process for automatically extracting a custom setting.

FIG. 11 is a flowchart illustrating a function of automatically extracting a custom setting. The process for automatically extracting the custom setting is described below with reference to the flowchart of FIG. 11.

Controller 180 automatically sets a setting value of a photographing condition based on a live-view image in the scene automatic determining mode (S21). Controller 180 generates a thumbnail image from the live-view image (S22). Controller 180 further finds tag information concerning the live-view image (S23). Specifically, Exif information, setting value difference information, and scene determination information are found as the tag information.

A custom setting of a matching scene is extracted from among custom settings stored in custom setting DB 50 based on the tag information thus found (S24). Whether or not the scenes match is determined based on information included in the scene determination information (FIG. 7B) included in the tag information. In a case where a large number of custom settings are extracted, a limit may be placed on a number of extracted custom settings. For example, a predetermined number of custom settings may be extracted in order of registration date from newest to oldest. Alternatively, in a case where the tag information further includes the determination information illustrated in FIG. 7C, similarity may be determined in consideration of the determination information (e.g., weather, date and time) illustrated in FIG. 7C in addition to matching of scenes, and a predetermined number of custom settings may be extracted in order of similarity from highest to lowest.

After extraction of the custom settings, controller 180 acquires thumbnail images and setting value difference information related to the extracted custom settings (S25). Then, controller 180 causes icons 40 representative of the specified custom settings to be displayed on display monitor 220 based on the acquired information, as illustrated in FIG. 9 (S26). The user can select a desired custom setting by selecting a single icon from among icons 40 displayed on display monitor 220 and can apply the custom setting to digital camera 100.

2.5 Application of Custom Setting

Figure 12:
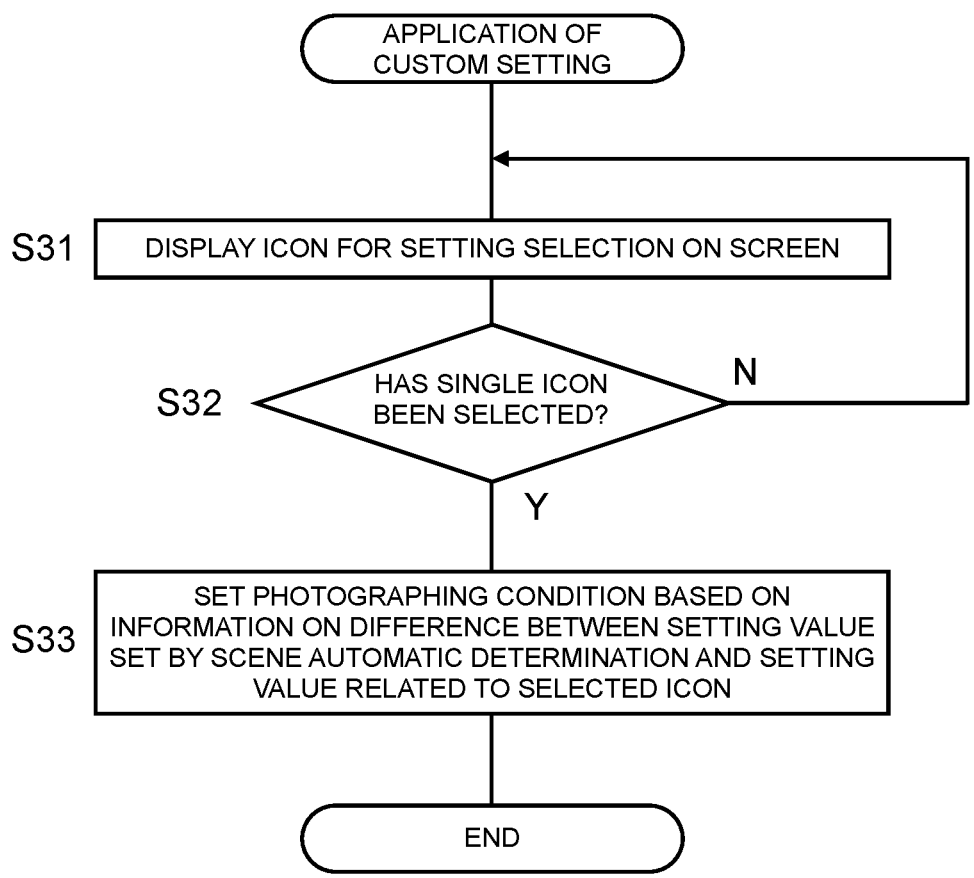
FIG. 12 is a flowchart illustrating a process for applying a custom setting.

A process for applying the custom setting using icon 40 displayed on display monitor 220 is described with reference to the flowchart of FIG. 12.

Controller 180 displays icons 40 on display monitor 220 in accordance with the process illustrated in FIG. 11 (S31) and determines whether or not single icon 40 has been selected (S32).

When single icon 40 is selected, controller 180 sets a photographing condition based on information on a difference between various kinds of setting values automatically set by the scene automatic determining mode and a setting value of the custom setting corresponding to selected icon 40 (S33). As a result, an image reflecting the newly set photographing condition is displayed as a live-view image on display monitor 220.

According to the above configuration, a change (style) of a photographing condition set in the past by a user can be reflected in a photographing condition automatically set by scene automatic determination based on a current photographing scene.

3. Effects and Other Remarks

Digital camera 100 according to the present exemplary embodiment includes display monitor 220, CCD 140 that images a subject and generates image data, image processor 160 that performs predetermined image processing on the image data generated by CCD 140, built-in memory 240 in which setting information concerning a setting for photographing set by a user is stored, and controller 180 that controls the imaging unit and the image processor. At a time of photographing, controller 180 (an example of a controller) extracts a custom setting (an example of setting information) corresponding to a photographing scene from among setting information stored in built-in memory 240 and causes icon 40 for selecting the extracted custom setting to be displayed on display monitor 220.

According to this configuration, a custom setting suitable for a current photographing scene can be automatically extracted from among custom settings registered in the past, and icon 40 for selecting the extracted custom setting can be displayed. This allows a user to visually select a desired custom setting thanks to displayed icon 40.

(Second Exemplary Embodiment)

Figure 13:
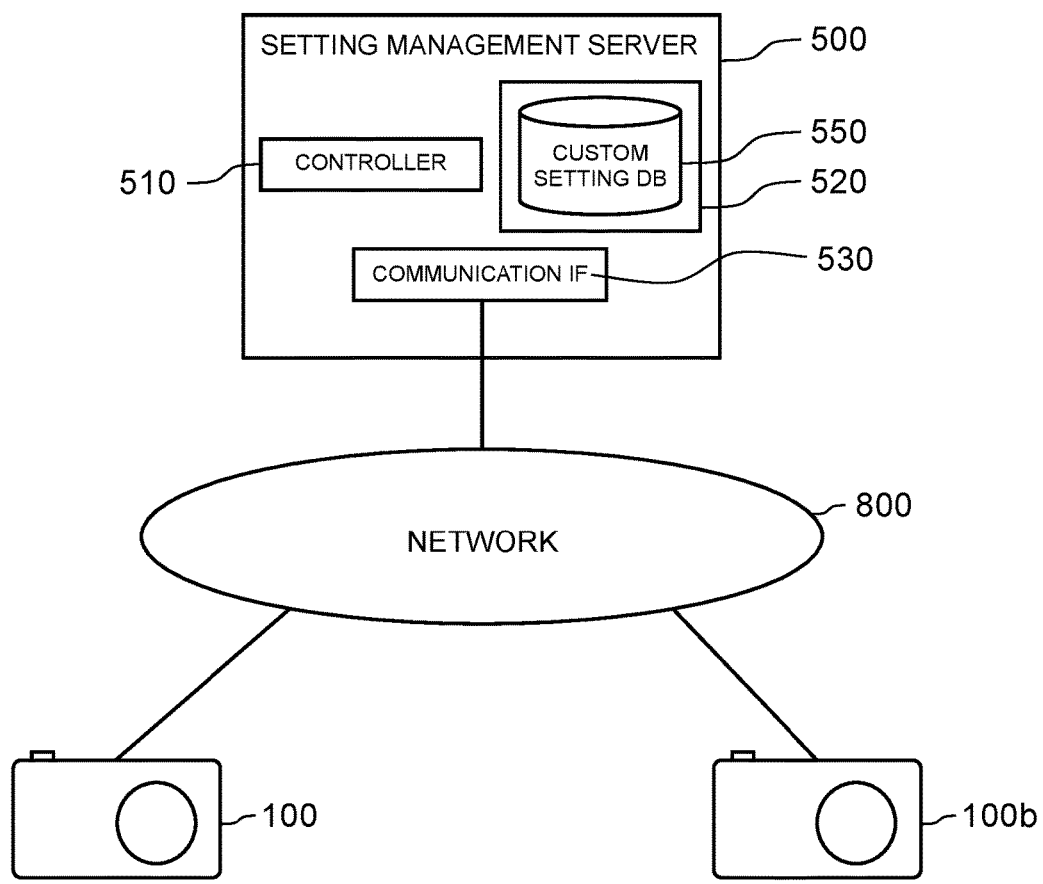
FIG. 13 is a view illustrating a cloud-form configuration.

In the first exemplary embodiment, digital camera 100 stores a custom setting in built-in memory 240 and applies the custom setting acquired from the digital camera 100 to photographing. Meanwhile, in the present exemplary embodiment, a configuration (a cloud-form configuration) in which information on a custom setting is acquired from a server on a network is described. FIG. 13 is a view for explaining a network configuration (a cloud-form configuration) according to the present exemplary embodiment. Digital camera 100 and setting management server 500 are connected to network 800. Digital camera 100 has similar configuration and function to the configuration described in the first exemplary embodiment. Network 800 is, for example, the Internet, a local area network (LAN), or a wide area network (WAN).

Setting management server 500 can be constituted by a typical computer and includes controller 510, storage unit 520, and communication interface 530. Controller 510 is a control unit that entirely controls setting management server 500. Controller 510 can be achieved by a semiconductor element, for example. Controller 510 may be configured by hardware alone or may be achieved by a combination of hardware and software. Controller 510 can be achieved by a microcontroller, a CPU, an MPU, a DSP, an ASIC, an FPGA, and the like.

Storage unit 520 stores custom setting database (DB) 550. Storage unit 520 is constituted by a hard disk, a solid state drive (SSD), a non-volatile memory, or the like. Custom setting DB 550 has a similar data structure to custom setting DB 50 described in the first exemplary embodiment (see FIG. 7A) and stores, as information concerning a custom setting, a thumbnail image of a certain image and tag information indicative of a setting environment at a time of photographing of the certain image. Digital camera 100 uploads information concerning a custom setting to setting management server 500 (custom setting DB 50) and downloads information concerning a custom setting from setting management server 500.

Communication interface 530 is a communication module (electronic circuit) for communication that complies with a predetermined communication standard and allows communication between setting management server 500 and an imaging device.

Figure 14:
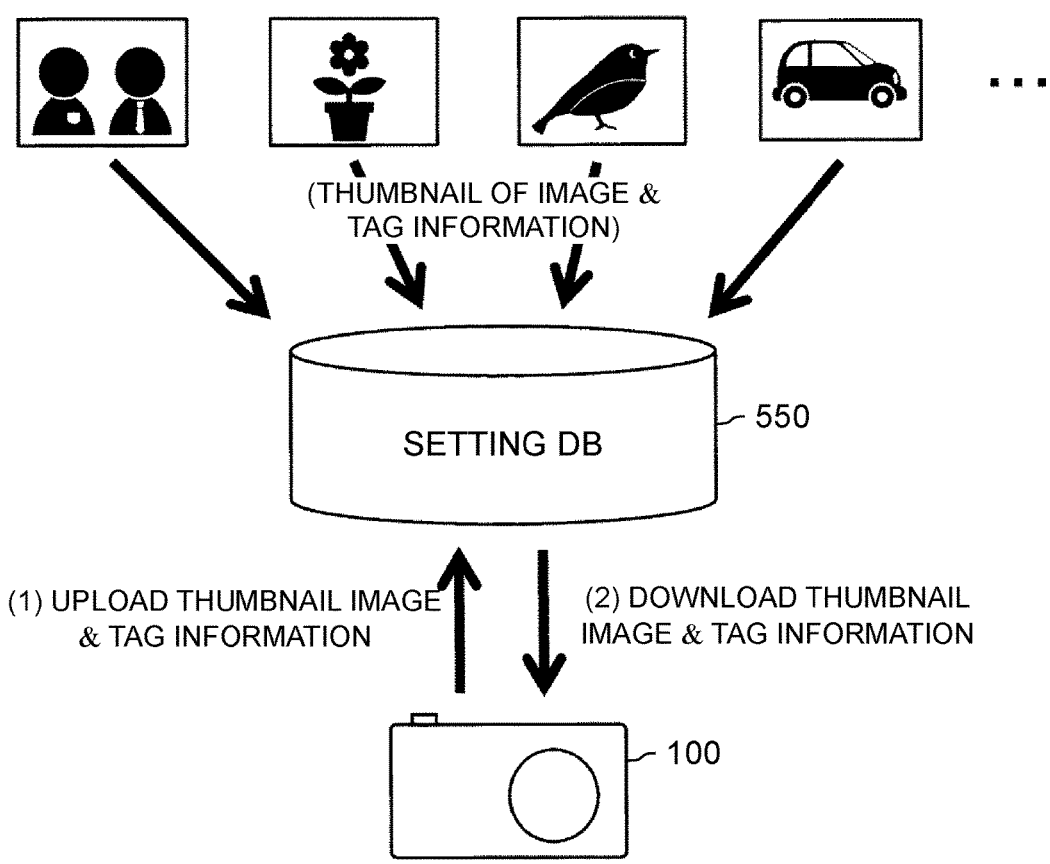
FIG. 14 is a view for explaining registration and acquisition of a custom setting in a custom setting database in the cloud form.

FIG. 14 is a view for explaining a concept of registration of a custom setting in custom setting DB 550 disposed on network 800 and acquisition of a custom setting from custom setting DB 550. Thumbnail images and tag information concerning various images are registered in advance as information concerning custom settings in custom setting DB 550 of setting management server 500. That is, custom setting DB 550 stores thumbnail images and tag information concerning a lot of images.

Figure 15:
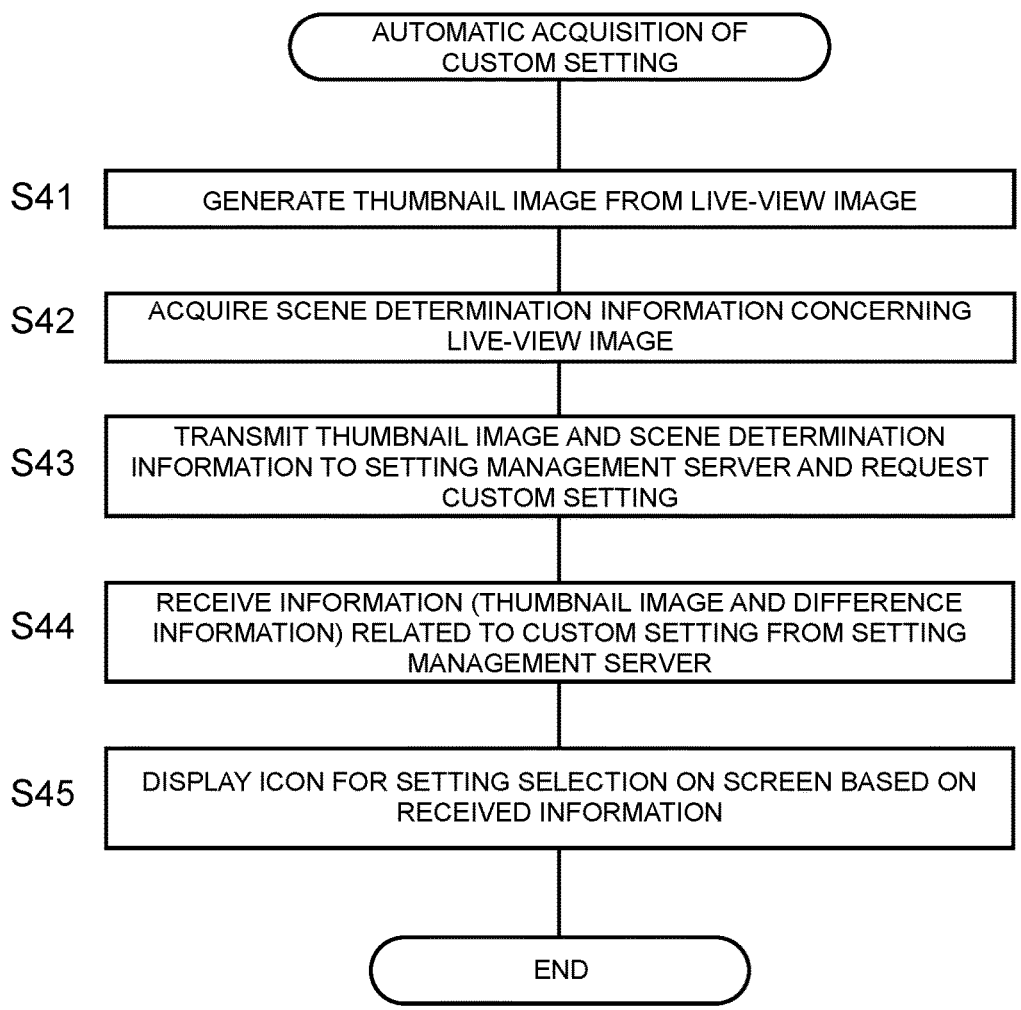
FIG. 15 is a flowchart illustrating a process for automatically acquiring a custom setting in the cloud form.

FIG. 15 is a flowchart illustrating a process for automatically acquiring a custom setting in the cloud-form configuration. The process for acquiring a custom setting according to the present exemplary embodiment is described below with reference to the flowchart of FIG. 15.

Controller 180 generates a thumbnail image from a live-view image based on an image currently captured by CCD 140 (S41). Furthermore, controller 180 acquires scene determination information (e.g., a face recognition result, a subject distance, and illuminance) concerning a live-view image (S42). Controller 180 requests transmission of a custom setting from setting management server 500 by transmitting (uploading) the thumbnail image and the scene determination information (e.g., a face recognition result, a subject distance, and illuminance) to setting management server 500 (S43).

Upon receipt of the request for transmission of a custom setting from digital camera 100, setting management server 500 searches for a custom setting of a matching scene based on the transmitted thumbnail image and scene determination information and then transmits information related to the custom setting thus found to digital camera 100. Details of this process in setting management server 500 will be described later.

Controller 180 receives (downloads) information related to a custom setting for a photographing scene from setting management server 500 (S44). Controller 180 causes icon 40 for setting selection to be displayed on a screen of display monitor 220 based on the received information (S45) (see FIG. 9).

Figure 16:
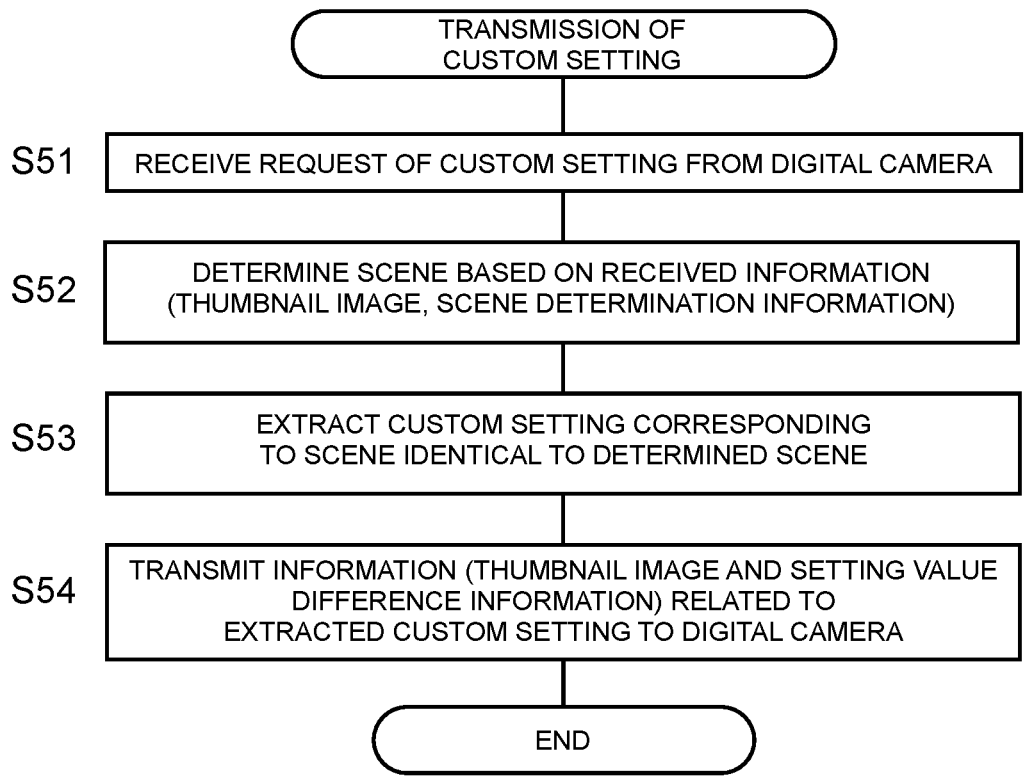
FIG. 16 is a flowchart for illustrating a process for transmitting a custom setting in a setting management server.

FIG. 16 is a flowchart illustrating a process performed when setting management server 500 receives a request for transmission of a custom setting from digital camera 100.

Upon receipt of a request for transmission of a custom setting from digital camera 100 (S51), controller 510 of setting management server 500 determines a scene based on information received from digital camera 100 (S52). That is, controller 510 determines a scene to be imaged by digital camera 100 based on a thumbnail image and scene determination information.

Then, controller 510 extracts a custom setting corresponding to a scene that matches the determined scene from among the plurality of custom settings stored in custom setting DB 550 based on the determined scene (S53). In a case where a large number of custom settings are extracted, a limit may be placed on a number of extracted custom settings. For example, a predetermined number of custom settings may be extracted in order of registration date from newest to oldest. Alternatively, in a case where the tag information further includes the determination information illustrated in FIG. 7C, similarity is calculated in consideration of the determination information (e.g., weather, date and time) illustrated in FIG. 7C in addition to matching of scenes, and a predetermined number of custom settings may be extracted in order of similarity from highest to lowest.

Controller 510 transmits, to digital camera 100, a thumbnail image and setting value difference information related to the extracted custom setting as a response to the request of a custom setting (S54).

Figure 17:
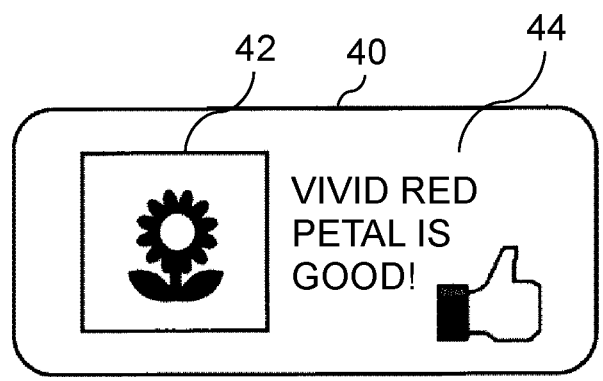
FIG. 17 is a view illustrating an icon for setting selection in which information acquired from a social networking service (SNS) is described.

As described above, it is possible to employ a configuration in which custom settings are stored in setting management server 500 on a network, a scene to be photographed by digital camera 100 is determined in setting management server 500, and a custom setting appropriate for the scene is selected and transmitted to digital camera 100. In this case, an image corresponding to a custom setting managed in custom setting DB 550 of setting management server 500 may be disclosed to public on a SNS. Setting management server 500 may transmit, as information concerning a custom setting, a comment made on the image on the SNS to digital camera 100 in addition to the thumbnail image and the setting value difference information upon receipt of request for a custom setting from digital camera 100. In this case, comment (text) 44 mentioned on the SNS may be displayed on display monitor 220 of digital camera 100 in addition to the thumbnail image on icon 40 for custom setting selection, as illustrated in FIG. 17. This allows the user to know reputation of the image on the Internet.

As described above, by registering custom settings in setting management server 500 on a network, the custom settings can be shared among various digital cameras. That is, a custom setting set in one digital camera can be used in another digital camera. This allows a user to take an image reflecting a style of another user.

That is, a system according to the present exemplary embodiment includes digital camera 100 and setting management server 500 connected to digital camera 100 over network 800. Setting management server 500 includes storage unit 520 in which setting information (e.g., tag information) concerning a setting for photographing is stored. Digital camera 100 transmits a thumbnail image and scene determination information that are used to determine a photographing scene to setting management server 500.

Setting management server 500 extracts setting information corresponding to a photographing scene from among setting information stored in storage unit 520 based on information used to determine the photographing scene and transmits the extracted setting information (e.g., setting value difference information) to digital camera 100. Digital camera 100 causes an icon for selection of the received setting information to be displayed on a display unit.

According to the above configuration, setting information concerning a custom setting can be stored on the cloud, and therefore the setting information can be shared among a plurality of digital cameras. Furthermore, a user can use a custom setting (style) set by another person and take an image of the same style as the other person.

(Other Exemplary Embodiments)

As described above, the first exemplary embodiment has been described to exemplify a technique disclosed in the present application. However, the technique in the present disclosure is not limited to this and can also be applied to exemplary embodiments having undergone changes, replacements, additions, omissions, and the like as needed. In addition, a new exemplary embodiment can be made by combining constituents described in the above first exemplary embodiment with other constituents. Hence other exemplary embodiments will be described below.

(1) In the above exemplary embodiments, a scene automatic determining mode in which a photographing scene is determined and setting information is set based on the determined scene has been described as an example of an automatic setting mode. However, the automatic setting mode is not limited to this. For example, the automatic setting mode may be a P mode in which a diaphragm value and a shutter speed are automatically set such that proper exposure is achieved. That is, a custom setting may be automatically registered after completion of photographing in a case where a user sets (changes) a photographing condition in addition to automatic setting in the P mode.

(2) The idea disclosed in the exemplary embodiments is applicable to both types of digital cameras with interchangeable lenses and digital cameras with built-in lenses.

(3) In the above exemplary embodiments, a digital camera is used as an example of the imaging device. However, the imaging device is not limited to this. The idea of the present disclosure is applicable to various imaging devices such as digital video cameras, smartphones, and wearable cameras which can shoot images.

(4) In the above exemplary embodiments, a CCD has been described as an example of an image sensor that constitutes an imaging unit. However, the image sensor is not limited to this. The imaging sensor may be a negative-channel metal-oxide semiconductor (NMOS) image sensor or may be a complementary metal-oxide semiconductor (CMOS) image sensor.

As described above, the exemplary embodiments have been described as an example of a technique according to the present disclosure. The attached drawings and detailed descriptions have been provided for this purpose. Accordingly, the constituent elements described in the attached drawings and detailed descriptions may include not only constituent elements that are essential to solve the problem but also constituent elements that are provided as examples used to exemplify the technique and are not essential to solve the problem. For this reason, even if these unessential components are described in the accompanying drawings and the detailed descriptions, these unessential components should not be immediately approved as being essential. Further, since the above exemplary embodiments illustrate the technique in the present disclosure, various modifications, substitutions, additions and omissions can be performed within the scope of claims and equivalent scope of claims.

The present disclosure is useful for an imaging device in which a setting concerning photographing arbitrarily set by a user can be registered. Specifically, the present disclosure is applicable to various imaging devices such as digital cameras, digital video cameras, smartphones, and wearable cameras, which can shoot images.

What is claimed is:

1. An imaging device comprising:
a display unit;
an imaging unit that images a subject and generates image data;
an image processor that performs predetermined image processing on the image data generated by the imaging unit;
a storage unit in which items of setting information concerning a setting for photographing set by a user are stored; and
a controller that controls the imaging unit and the image processor, wherein
at a time of photographing, the controller extracts setting information corresponding to a photographing scene from among the items of setting information stored in the storage unit and causes an icon for selecting the extracted setting information to be displayed on the display unit, and
the icon includes a thumbnail image generated based on an image acquired when each of the items of the setting information set by the user is stored.

2. The imaging device according to claim 1, wherein
the controller has, as an operation mode, an automatic setting mode in which a setting for photographing is determined based on information concerning at least one of an image taken by the imaging unit and a subject; and
in a case where an image is taken in a state where a setting for photographing is automatically set in the automatic setting mode and the setting is set by the user, the controller causes difference information indicative of a difference between a setting value set by the user and a setting value set by the automatic setting mode to be included in the setting information.

3. The imaging device according to claim 2, wherein the setting information further includes a thumbnail image and information to be used to determine a photographing scene.

4. The imaging device according to claim 3, wherein the automatic setting mode is an operation mode in which a photographing scene of an image taken by the imaging unit is determined, and the setting information is set based on the determined scene.

5. The imaging device according to claim 2, wherein the automatic setting mode is an operation mode in which a photographing scene of an image taken by the imaging unit is determined, and the setting information is set based on the determined scene.

6. The imaging device according to claim 1, wherein the setting information includes a setting concerning at least one of a diaphragm, a shutter speed, an exposure correction value, an ISO sensitivity, and white balance.

7. The imaging device according to claim 1, further comprising a communication unit for communication with a server on a network,
wherein the controller transmits information to be used to determine the photographing scene to the server through the communication unit and receives setting information corresponding to the photographing scene from the server through the communication unit.

8. A system comprising:

an imaging device; and a server that is connected to the imaging device over a network, wherein the server includes a storage unit in which items of setting information concerning a setting for photographing set by an unspecified user are stored, the imaging device transmits information to be used to determine a photographing scene to the server, the server extracts setting information corresponding to the photographing scene from among the items of setting information stored in the storage unit based on the information to be used to determine the photographing scene and transmits the extracted setting information to the imaging device, the imaging device causes an icon including a thumbnail image generated based on an image acquired when each of the items of setting information is stored to be displayed on a display unit in order to accept selection of the received setting information, and the icon includes a thumbnail image generated based on an image acquired when each of the items of setting information set by the unspecified user is stored.

* * * * *